Dec. 25, 1951  H. W. HOUSTON  2,579,741
MOTION-PICTURE FILM DEVELOPER FEEDING DEVICE
Filed Nov. 18, 1946  3 Sheets-Sheet 1
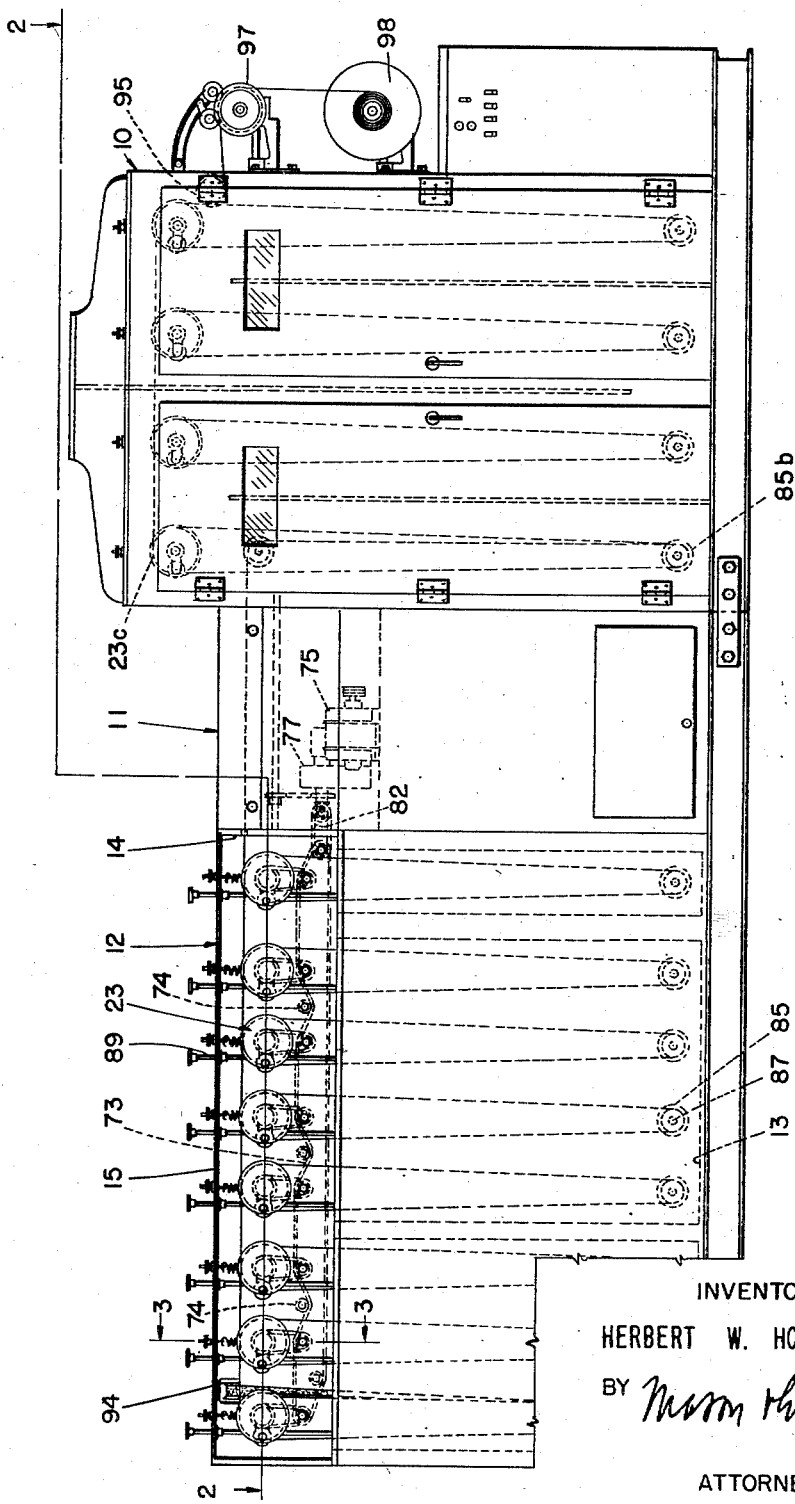
INVENTOR
HERBERT W. HOUSTON
BY
ATTORNEYS Dec. 25, 1951     H. W. HOUSTON     2,579,741
MOTION-PICTURE FILM DEVELOPER FEEDING DEVICE
Filed Nov. 18, 1946     3 Sheets-Sheet 2
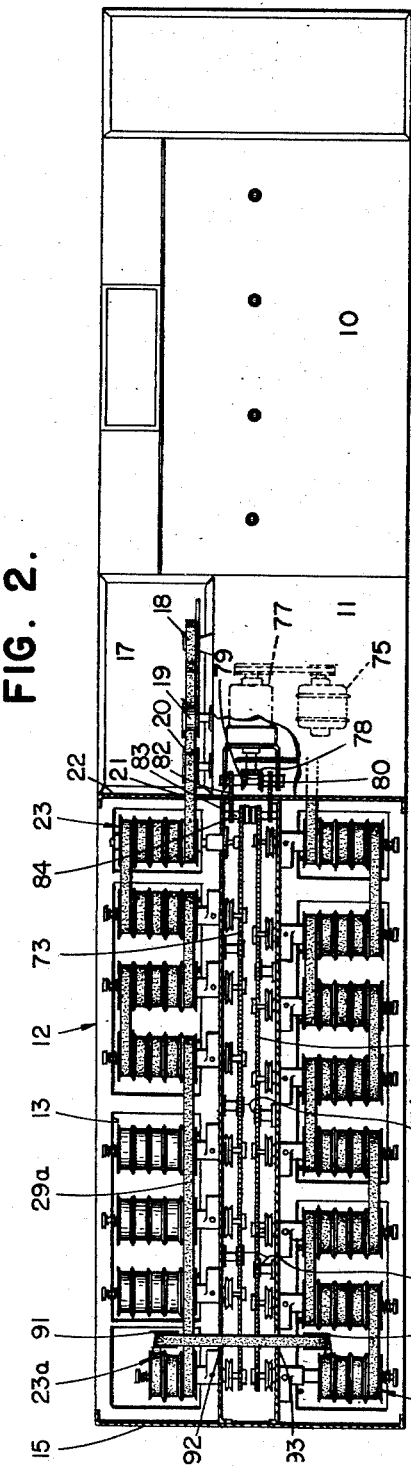
INVENTOR
HERBERT W. HOUSTON
BY
ATTORNEYS Dec. 25, 1951  H. W. HOUSTON  2,579,741
MOTION-PICTURE FILM DEVELOPER FEEDING DEVICE
Filed Nov. 18, 1946  3 Sheets-Sheet 3
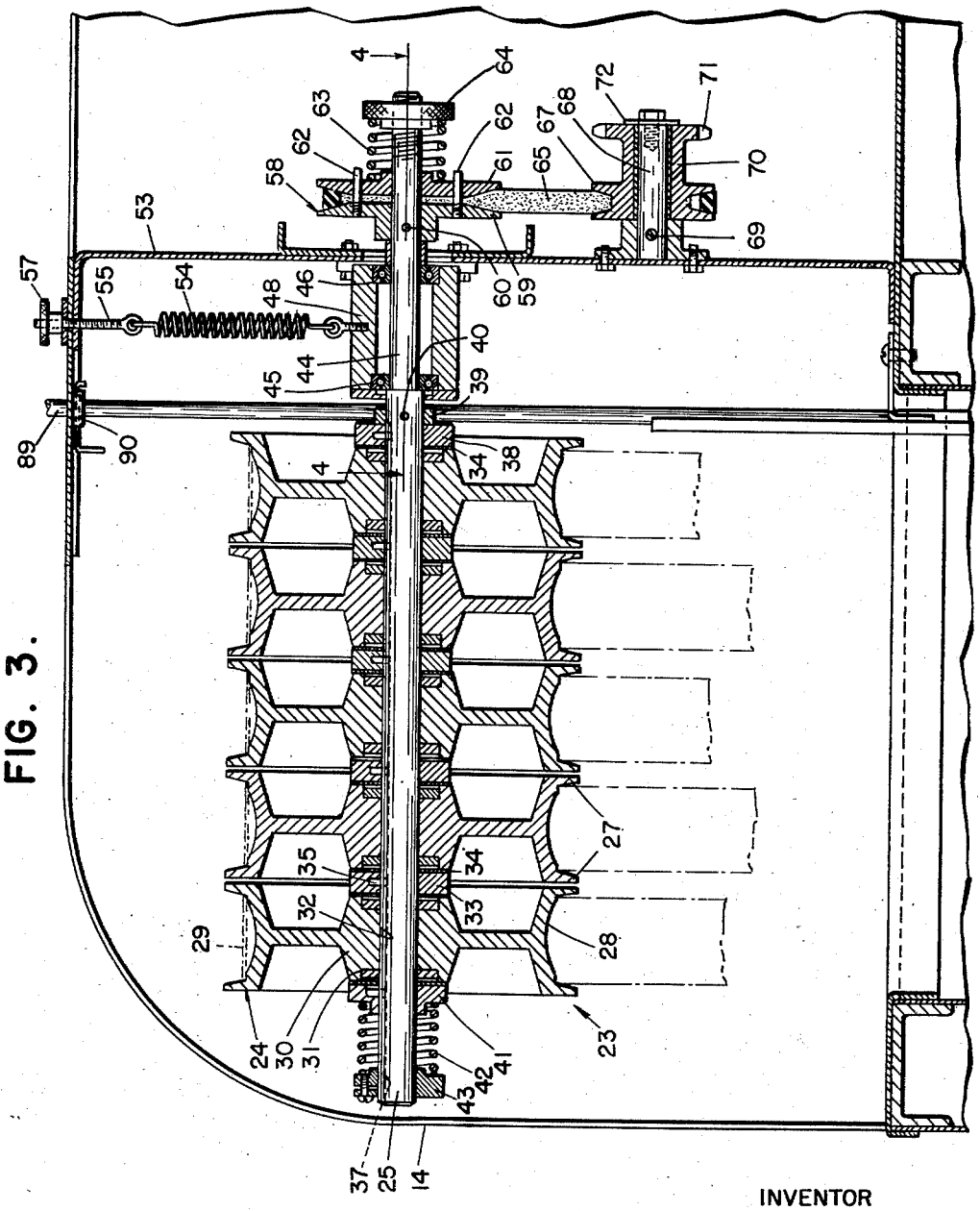
INVENTOR
HERBERT W. HOUSTON
BY
ATTORNEYS Patented Dec. 25, 1951

2,579,741

UNITED STATES PATENT OFFICE 2,579,741

MOTION-PICTURE FILM DEVELOPER FEEDING DEVICE

Herbert W. Houston, Sherman Oaks, Calif., assignor, by mesne assignments, to Houston-Fearless Corporation, Los Angeles, Calif., a corporation of California Application November 18, 1946, Serial No. 710,558

4 Claims. (Cl. 271—2.3)

The present invention relates to a film developer and more particularly to a developer having film feed mechanism adapted to have proper and controlled feeding engagement with the film as it is treated successively in a plurality of baths, and then is dried and wound on a take-off reel.

Various types of motion picture films require different developing processes. For example, a black and white film requires a different type of developing bath from a color film, and some color film requires exposure to certain light rays during the development process, which is generally referred to as "flashing" the film.

As the film, which is placed in the machine as a dry undeveloped roll, progresses through the developing process, the wetting of the film tends to elongate it. This elongation may amount to approximately two percent (2%), while in the drying of the film it may shrink to even less than its original length. The final finished length of the film may be approximately ninety-eight percent (98%) of its original dry length.

In order to insure proper feeding of the film at all stages of the developing process, it is desirable to maintain the film under light but constant tension during its progress through the developing machine and also to keep the traveling loops of the film immersed to a constant depth in the various baths through which the film is passed. Various expedients have been resorted to in an attempt to take up the slack produced by this elongation of the film, at its intermediate stage of progress through the developer, but up to the present time no satisfactory development for this purpose has been achieved so far as I am aware. The result has been that at times valuable original films which were irreplaceable have been damaged by the presence of uncompensated slack in the film during its progress through a developing machine.

An object of the present invention is to make an improved and simplified film feeding mechanism for a developing machine.

Another object is to make a film developing machine for continuously processing motion picture film with means for maintaining a positive driving action on the film through its length and to compensate for elongation and shrinkage of the film during its progress through the various stages of the machine.

Another object is to make a film feeding device for a motion picture film developing machine wherein substantially uniform tension will be maintained on the film throughout its driven length, and wherein elongation of the film will produce an increased length of film loop together with an accelerated driving speed at an intermediate stage of the film's travel through the machine.

Another object is to maintain uniform tension with variable speed drive driving characteristics on a motion picture film as it progresses through a developing machine.

These and other objects of the invention will be more fully set forth in the following description and the accompanying drawings, comprising three sheets. In the drawings:

Fig. 1 is a side elevational view of a motion picture film developing machine embodying the present invention, an upper closure plate along one side of a developing compartment being removed to show the interior of the compartment; film driving mechanism, solution tanks, and lower film guiding rollers being indicated in dotted lines;

Fig. 2 is a view, partly in plan, and partly in horizontal section, taken on the offset line 2—2 of Fig. 1;

Fig. 3 is an enlarged fragmentary vertical transverse sectional view taken on the line 3—3 of Fig. 1;

Fig. 4 is a similarly enlarged fragmentary horizontal transverse sectional view taken on line 4—4 of Fig. 3; and Fig. 5 is a similarly enlarged fragmentary vertical longitudinal sectional view taken on the line 5—5 of Fig. 4.

Referring to the drawings in detail, a film developing machine comprises three main compartments, namely, a film drying compartment 10, an intermediate motor drive compartment 11, and a film developing compartment 12. The developing compartment 12 has a plurality of solution tanks 13 therein, and is completely enclosed by removable closure plates 14 which are joined to each other and to a framework 15 of the compartment so as to provide a light-tight enclosure.

A film chamber 17 is provided in the intermediate compartment 11 in which a frictionally retarded reel 18 of exposed but undeveloped motion picture film is pivotally mounted. A pair of idler rollers 19 and 20 are pivotally mounted in the chamber 17, in line with the supply reel 18, the idlers being positioned adjacent a slotted openng 21 in a wall 22 which separates the central compartment 11 from the developing compartment 12.

A plurality of film guide and drive pulley assemblies 23 are mounted in longitudinal alignment along one side of the center of the developing compartment 12, and a second pularity of such assemblies are mounted similarly along the other side of the center of the developing compartment. Each of the main film drive assemblies 23, as illustrated particularly in Figs. 3, 4 and 5, comprises five drive pulleys 24 pivotally mounted on a common driven shaft 25.

The periphery of each of these pulleys has side flanges 27, between which to receive a film 29 of a width for which the machine is designed. The central portion of the base of the peripheral face of each pulley 24 is recessed slightly as at 28 to avoid contact with the central portion of the film 29 being processed. A cross sectional view of the film as it appears supported on the pulleys is illustrated in Fig. 3.

Each of the film drive pulleys 24 has a relatively large hub portion 30 with an annular endwise recess 31 around a central shaft opening 32 therein, in which is journaled the driven shaft 25. Interposed between adjacent pulleys 24 are a plurality of annular frictional drive members 33 having clutch faces 34, of suitable frictional material such as asbestos clutch facing material, secured to opposite sides thereof. A drive key 35 is mounted in each of the annular frictional members to extend into the central opening thereof.

The driven shaft 25 has a longitudinal keyway 37 therein adapted slidably to receive the inwardly projecting ends of the keys 35 so as to provide a positive drive for these annular frictional members from the shaft 25 and at the same time permit slidable movement of these members axially of the shaft.

An annular frictional end drive member 38 is provided on the inner end pulley of each group 23, and this end member has a frictional facing 34 on one side only thereof. The other side of the inner frictional drive member abuts against a collar 39 which is fixed in position on the shaft 25 by a pin 40. Another annular frictional end drive member 41 is slidably mounted on the shaft 25 at the outer end of the group of pulleys. This outer end member also has a frictional facing 34 secured to one side only thereof. The outer side of this outer end member 41 is engaged by a compression coil spring 42, the outer end of which engages a collar 43 secured in adjusted position adjacent the outer end of the shaft 25. This arrangement of the frictional drive members and the pulleys 24 provides an adjustable clutch type of driving arrangement for each of the pulleys, but allows some individual slippage of the pulleys to compensate for minor differences in the lengths of the film loops passing over the film drive pulleys 24.

The driven shaft 25 is reduced in diameter slightly as at 44 and is journaled in a pair of ball bearings 45 and 46 which are mounted in opposite ends of a tubular hub 48. The hub is carried by a lever arm 49, as shown in Figs. 4 and 5, which in turn is formed integrally with a boss 50. The boss is pivoted on a pivot pin 51, secured to a base plate 52 which is bolted to a longitudinal inner wall 53 of the developing compartment 12. A coil spring 54 is connected in tension between the hub 48 and an adjusting screw 55 which is supported by a knurled nut 57 from the top of the compartment. This tends to draw the hub 48 upwardly about the pin 51 as a pivot to the upper limit of its movement.

The wall 53 has an arcuate slotted opening therein which permits limited arcuate up and down movement of the hub 48 about the pivot pin 51 as a center.

A divided V pulley 58 is mounted on the driven shaft 25 on the opposite side of the wall 53 from the pulleys 24. One portion 59 of this divided pulley is affixed to the shaft 25 by a pin 60. The other portion 61 of the pulley is slidably mounted on the shaft 25 and on drive pins 62 mounted in the fixed pulley portion 59. The slidable portion 61 of the pulley is urged toward the fixed portion 59 by a coil compression spring 63 which bears against the outer side of the slidable pulley portion 61, the other end of the spring being engaged by a knurled adjusting nut 64 threaded onto the end of the shaft.

A V belt 65 passes over the divided pulley 58 and is driven by a V drive pulley 67 which is pivotally mounted on a stub shaft 68 secured in a bracket 69 mounted on the wall 53. The V drive pulley 67 has an extended hub portion 70 with a driving sprocket 71 secured on an end thereof. The combination V pulley and sprocket is retained on the stub shaft 68 by a suitable retaining washer 72.

A pair of drive chains 73 and 73a (see Figs. 1 and 2) are mounted longitudinally of the developing compartment on opposite sides of the central partitions thereof to have driving engagement with the sprockets 71. Idler sprockets 74 are provided between each second pair of film drive pulley assemblies to retain the drive chains in driving engagement with the sprockets.

The drive chains 73 and 73a are driven in opposite directions from each other by a motor 75 which is provided with suitable speed reducer and control mechanism 77 of a usual type which drives a bevel drive gear 78. The bevel drive gear is in driving connection with a pair of driven bevel gears 79 and 80 which are mounted coaxially with each other, but are pivoted relatively to each other so as to permit them to rotate in opposite directions under the driving impulses of the bevel drive gear 78.

The driven bevel gear 79 has driving connection with a short shaft 80, which is connected by sprockets and a drive chain 82 to a countershaft 83. The countershaft has a sprocket secured thereto which has driving engagement with one main drive chain 73. Similar driving engagement is provided from the beveled drive gear 78 to the other main drive chain 73a.

A plurality of film loop lower end idler pulleys 85 having peripheries generally similar to but of smaller diameter than the pulleys 24 are mounted, in groups corresponding to their respective drive pulley groups 23. The idler pulleys of each group are pivoted freely on a shaft 87 secured to the lower end of a slide rod 89. The slide rods are slidably mounted in bushings 90 in the top of the developing compartment so as to permit raising the idler pulleys to a position just below the film drive pulleys 24 when initially threading a film into the machine. These slide rods at other times rest on the bottom wall of the tank 13 with their upper ends projecting sufficiently through the bushings 90 as shown in Figure 1 to enable the operator to manually grasp the end caps on their upper ends for raising the rods and idler pulleys mounted thereon.

A cross-over arrangement for carrying the film from one side of the machine to the other is provided by the arrangement illustrated at the left end of Figs. 1 and 2. In this arrangement but three film drive pulleys 24 are mounted on a driven shaft assembly 23a. A cross over idler pulley 91 is mounted with its axis at right angles to the pulleys 23a in position to receive the film as it passes up from the outer lower idler pulley 85. The film is twisted through an angle of 90° as it passes from the lower idler pulley to the crossover idler pulley 91. The film crosses over to the other side of the developing compartment through slotted openings 92 and 93 in the inner walls of the developing compartment, and passes over a second idler pulley 94 mounted in line with the first idler pulley 91. From the second idler pulley 94 the film passes downwardly through a quarter twist to the inner lower idler pulley 85 of a group 23b of feed pulleys. Thence it passes around a series of groups 23 of feed pulleys along the other side of the developing compartment toward the drying compartment 10.

From the last group 23 of film feed pulleys in the developing compartment the film is directed through suitable slotted openings into the drier cabinet 10. Here the film is run over a series of feed pulleys 23c indicated in dotted lines in Fig. 1, which are similar to those used in the developing compartment and similarly, automatically, adjustably mounted, and around a series of freely rotatable lower pulleys 85b which are similar to those carried by the slide rods 89 in the developing compartment.

The drying cabinet is higher than the developing compartment so as to accommodate greater film length in a smaller floor space. The drying compartment is provided with suitable heat and humidity controls, and air circulating and filtering means so as to maintain a required flow of clean air having proper temperature and humidity for drying the film.

After the film has completed its run through the drying compartment, it is fed outwardly under an idler pulley 95, through a slotted opening in the side of the drying cabinet, over a frictionally driven pulley 97, and onto a frictionally driven takeoff reel 98.

In using the device, suitable developing, washing and fixing solutions are introduced into the various tanks before beginning the developing process. In order to carry the film through the various stages of the machine, a leader, which usually is a length of special leader material of the size for which the machine is designed, is first threaded through the machine and around the pulleys in the same course which the film to be developed is to follow. During this initial threading process the slide rods 89 are pulled upwardly to their full limit of movement so as to bring the lower idler pulleys 85 closely beneath the film driving spools 24. In case one of the tanks is not to be used in the developing of a particular film, the film is bypassed directly across this tank, as illustrated at 29a in Fig. 2.

After the leader has been threaded through the machine, the film feeding mechanism is started up slowly by energizing the driving motor 75 with the speed control mechanism 77 properly retarded. The slide rods 89 then are moved downwardly to their full limit of movement to elongate the loops of film and to carry them well down into the tanks of solutions. As the lower idler pulleys are secured to the lower ends of the slide rods 89, the pulleys 85 will, when the rods 89 are in their lowermost position, also occupy their lowermost positions during normal operative conditions of the developing machine and will not be lowered or raised by any lengthening or shortening of the film, due to wetting or drying thereof. The weight of the pulleys 85, shafts 87 and rods 89 will hold the pulleys vertically stationary in their lowermost position under normal operative conditions, any relatively small change in length and tension of the film loops being reflected in vertical movement of the upper pulley shafts 25 which are held floatingly in position by the coiled springs 54. After the leader has thus been threaded and extended, the end of the exposed but undeveloped film is spliced to the end of the leader, and the film feed rate is speeded up, as by means of the variable speed control mechanism 77 to a required developing speed. This speed may be in the neighborhood of one hundred feet per minute, although the speed of developing may vary greatly with the size and type of film to be developed and the types and strengths of solutions employed.

After the leader has completed its run through the machine, it ordinarily is cut off from the actual film being developed which then is threaded onto a new take-off reel 98 which replaces the one which has been used to receive the leader.

As the dry undeveloped film enters the machine at a predetermined speed, the driving force imparted to the film by the feed pulleys 24 through the V belt 65 and the divided driven pulley 58 has a tendency to hold the feed pulleys 24 downwardly against the tension of the coil springs 54. This action decreases the center to center distance of the divided pulleys 58 and the V drive pulleys 67. The compression coil spring 63 forces the sliding pulley portion 61 toward the fixed portion 59, and thereby forces the V belt radially outwardly. This increases the effective diameter of the driven divided pulley 58.

As the film progresses through the solutions in the tanks of the developing compartment and becomes thoroughly wet, it elongates, and this elongation of the film eases the tension on the film and permits the coil tension springs 54 to raise the hubs 48 upwardly about their pivot pins 51. As the springs 54 move the hubs 48 upwardly, the center to center distance of the pulleys 58 and 67 is increased. This forces the V drive belt 65 radially inwardly on the divided pulley 58, thereby forcing the slidable portion 61 of the divided pulley axially outwardly against the force of the coil compression spring 63. This reduces the effective diameter of the divided driven pulley 58, which increases the speed of rotation of the driven shaft 25, and thereby increases the rate of feed of the film 29.

After the film has passed through the developing phase and enters the drying compartment 10 and is dried, it again shrinks gradually back to a length approximating its original length. This increases the tension on the film, which again tends to draw the pulley assemblies 23c downwardly, thereby elongating the tension springs 54 and, as set forth above, positions the V belt at a proper peripheral distance on each set of pulleys to accomplish the proper driving effect required by the thus reduced film length.

Any irregularities in driving tension between adjacent pulleys within a group are readily absorbed by slippage of the pulleys with respect to their frictional driving members 33.

The device comprises a simple and positive film driving arrangement which maintains a substantially uniform tension on the film throughout its length in the developing machine, and provides for driving the wet intermediate portions of the film in an elongated condition at the necessarily more rapid rate than both of the relatively shorter dry end portions.

While I have illustrated and described a preferred embodiment of my invention, it will be apparent to those familiar with the art that the device is capable of several changes without departing from the spirit of the invention. It is desired, therefore, not to limit the invention except as specifically set forth in the following claims.

I claim:

1. In a motion picture film developer, a film feeding device comprising a plurality of film drive pulleys rotatably mounted on a driven shaft, said shaft being movable in a direction normal to its axis, frictional drive means having driven connection with said shaft and having frictional driving engagement with each of said pulleys, spring pressed means mounted to maintain said pulleys in frictional engagement with said frictional drive means, a divided V belt pulley having a portion thereof secured to said driven shaft, a second portion of said pulley having slidable engagement with said driven shaft, and a power driven V belt having driving engagement with said divided pulley, said pulley being positioned to increase the driven radius of said divided pulley on a predetermined movement of said driven shaft in a direction normal to its axis.

2. In a motion picture film developer, a film feeding device comprising a driven shaft mounted for bodily movement in a plane normal to the shaft axis, a plurality of film drive pulleys rotatably mounted on the driven shaft, a plurality of frictional drive elements mounted between adjacent pulleys and having driven connection with said shaft, first spring means mounted to press said pulleys into frictional driven engagement with said frictional drive discs, a divided V belt pulley having a first portion thereof secured to said driven shaft, a second portion of said pulley mounted slidably on said driven shaft, second spring means mounted to press the second portion of the divided pulley toward the first portion thereof, and a power driven V belt having driving engagement with said divided pulley, said pulley being positioned to increase the driven radius of said divided pulley one a predetermined movement of said driven shaft bodily in a plane normal to the shaft axis.

3. In a motion picture film developer, a film feeding device comprising a driven shaft mounted for bodily movement in a plane normal to the shaft axis, a plurality of film drive pulleys rotatably mounted on the driven shaft, a plurality of frictional drive elements mounted between adjacent pulleys and having driven connection with said shaft, first spring means mounted to press said pulleys into frictional driven engagement with said frictional drive discs, an adjustable control mounted to regulate the pressure pressing said spring means into frictional driven engagement with said discs, a divided V belt pulley having a first portion thereof secured to said driven shaft, a second portion of said pulley mounted slidably on said driven shaft, second spring means mounted to press the second portion of the divided pulley toward the first portion thereof, and a power driven V belt having driving engagement with said divided pulley, said pulley being positioned to increase the driven radius of said divided pulley on a predetermined movement of said driven shaft bodily in a plane normal to the shaft axis.

4. In a motion picture film developing machine, a plurality of film feeding devices, each comprising a first pulley means mounted for free rotation and including a pulley shaft at a vertically lower level and held at said level by the weight of said pulley means against relatively small elevating forces, a second pulley means including a pulley shaft and mounted at a vertically upper level in alignment with the first pulley means for carrying in cooperation with the first pulley means a looped length of film, a coiled spring for vertically movably supporting the shaft of said second pulley means on the developing machine in yieldable opposition to the tension of the looped film, a V-belt pulley on the shaft comprising two axially relatively movable disks, a spring for yieldably urging the disks toward each other, a power driven V-belt pulley on the opposite side of the said shaft from said shaft supporting spring, and a V-belt for said V-belt pulleys.

HERBERT W. HOUSTON.

REFERENCES CITED

The following references are of record in the file of this patent:

UNITED STATES PATENTS

| Number | Name | Date |
| --- | --- | --- |
| 1,854,604 | Steinmann | Apr. 19, 1932 |
| 2,029,854 | Cannity | Feb. 4, 1936 |
| 2,079,849 | Geib | May 11, 1937 |
| 2,096,231 | Ensign et al. | Oct. 19, 1937 |
| 2,146,170 | Brenbarger et al. | Feb. 7, 1939 |
| 2,210,880 | Capstaff | Aug. 13, 1940 |
| 2,427,943 | Butterworth et al. | Sept. 23, 1947 |